United States Patent [19]
Howell

[11] Patent Number: 5,106,108
[45] Date of Patent: Apr. 21, 1992

[54] CHILD'S SULKY AND ATTACHMENT TO A HUMAN

[76] Inventor: Patrick L. Howell, 8168 Capitola Ave., Fair Oaks, Calif.

[21] Appl. No.: 245,909

[22] Filed: Sep. 19, 1988

[51] Int. Cl.⁵ ............................................. B62B 7/02
[52] U.S. Cl. .................................. 280/1.5; 280/192; 280/47.25
[58] Field of Search ............... 280/1.5, 47.25, 202, 280/204, 415.1, 203, 492, 494; 403/291

[56] References Cited

U.S. PATENT DOCUMENTS

| | | | |
|---|---|---|---|
| 21,012 | 7/1858 | Maynard | 280/47.25 |
| 70,056 | 10/1867 | Wheelock | 280/47.25 |
| 1,259,195 | 3/1918 | Ambler | 280/47.25 |
| 3,328,043 | 6/1967 | Johnson | 280/1.5 |
| 3,498,633 | 3/1990 | Hopkins | 280/204 |
| 3,984,115 | 10/1976 | Miller | 280/30 |
| 4,051,985 | 10/1977 | Berger | 280/202 |
| 4,431,121 | 2/1984 | Bensette | 280/1.5 |
| 4,470,610 | 9/1984 | Wilson | 280/47.25 |
| 4,848,780 | 7/1989 | Straub | 280/1.5 |

FOREIGN PATENT DOCUMENTS

| | | | |
|---|---|---|---|
| 13152 | 4/1929 | Australia | 280/47.25 |
| 3434502 | 3/1986 | Fed. Rep. of Germany | 280/47.25 |
| 412119 | 4/1910 | France | 280/1.5 |
| 842329 | 6/1939 | France | 280/204 |
| 8600054 | 1/1986 | World Int. Prop. O. | 280/1.5 |

OTHER PUBLICATIONS

"Baby Jogger", Advertisement from Runner's World, Sep. 1988.
"Threewheel Wonder", Advertisement from Runner's World, Sep. 1988.

*Primary Examiner*—David M. Mitchell
*Attorney, Agent, or Firm*—Bernhard Kreten

[57] ABSTRACT

A sulky and harness system for transporting young children while jogging. The harness includes an area of connection to a tongue of the sulky that allows three different degrees of freedom to provide biomechanical efficiency while jogging. In addition, the harness worn by the jogger is configured and attached to the sulky to provide ergometric efficiency.

17 Claims, 2 Drawing Sheets

CHILD'S SULKY AND ATTACHMENT TO A HUMAN

FIELD OF THE INVENTION

The following invention relates generally to a sulky used in transporting a child. More specifically, a sulky attaches to a harness worn by a human in such a manner that the human's activities (for example jogging) can proceed with minimal constraint. Thus, the child seated in the sulky can accompany the jogger.

BACKGROUND OF THE INVENTION

While jogging continues to provide a primary form of exercise and entertainment, it is not always possible to involve one's entire family. This is particularly true for smaller children. After a certain age, children can accompany their parents on bicycles. However, very young children are not accomodated.

Moreover, when more than one adult in the family desires to go jogging, having a child of tender years precludes both adults from jogging at the same time since one must remain behind to care for the children who cannot participate or travel along on a bicycle.

While various appliances have been developed which allow young children to accompany parents on their backs, on bicycles or in strollers, a feasible alternative does not exist for a parent who jogs. The following patents reflect the state of the art of which applicant is aware, insofar as these patents appear relevant to the process at hand.

| 3,984,115 | Miller | October 5, 1976 |
| 21,012 | Maynard | July 27, 1858 |
| 1,259,195 | Ambler | March 12, 1918 |
| 4,431,121 | Bensette | February 14, 1984 |
| 70,056 | Wheelock | October 22, 1867 |
| "Baby Jogger Advertisement" | | September, 1988 |
| "Three-Wheel Wonder Advertisement" | | September, 1988 |

The product "Baby Jogger" fairly respresents the current state of the art. A three wheeled cart carries the child. The adult pushes the cart while jogging. While this device allows one to jog and attend a child concurrently, the jogger's natural running motion has been modified. Specifically, the arm swing and cornering balancing has been altered.

The patent to Ambler teaches the basic use of a sulky for children which includes a tongue that extends from the sulky and has a free end which is to be pulled in some unspecified manner. A child's seating area and a wheeled means at a trailing portion thereof preclude the sulky from tipping over backwards. While this patent teaches the use of certain structure having coincidental similarity with the instant invention, it is silent with respect to certain important structural features which make the sulky viable for use in its intended environment with a jogger.

The patent to Bensette teaches the use of a towing device in which a frame has a pair of supports mounted on one's back which allows objects to be towed behind. This patent has more dissimilarities than similarities with the instant invention.

The remaining citations show the state of the art further. For example, Maynard provides a child's carriage as does Wheellock, and each diverge even more from the instant invention than Ambler.

SUMMARY OF THE INVENTION

The instant invention is directed to an instrumentality which allows a young child to accompany the parent when the parent is jogging. More specifically, a sulky is provided which includes an axle having free ends which support wheels. The axle in turn underlies and supports a child's seat with a frame member interposed therebetween. Trailing from a rearward portion of the frame is a device which precludes the child's seat from tipping over backwards. Extending forward from the child's seat is a tongue having a goosenecked portion which allows the sulky to be free standing when not in use. The tongue includes an upwardly and forwardly extending section that is capable of adjustment with respect to height. A free end of the sulky tongue attaches to a specially formed harness which is designed to couple to a jogger providing minimal interference with the normal jogging motion. The harness is strategically oriented to allow the sulky to be towed behind the jogger efficiently.

The harness includes, in a preferred form, a belt which girds the user and has a trailing portion thereof dimensioned to comfortably reside within a small area of the back. A force distribution plate on an outer surface of the belt near the small of the back includes a coupling to the tongue that allows motion in three different directions. The belt also includes a suspender type harness to further enhance force distribution. Padding is strategically deployed on the belt for damping forces generated when using the sulky.

OBJECTS OF THE INVENTION

It is a primary object of the present invention to provide a new and useful jogging apparatus for allowing a child to accompany the jogger.

A further object of the present invention is to provide a device as characterized above which is extremely safe to use and does not interfere with the normal biomechanical function of the jogger while running.

A further object of the present invention is to provide a device as characterized above which is extremely safe to use, is extremely durable in construction, and lends itself to mass production techniques.

It is yet a further object of the present invention to provide a device as characterized above which naturally accomodates the anatomy of the jogger and is strategically located at a portion of the jogger's body so that the child passenger being towed therebehind is subjected to a minimum amount of oscillatory, rocking motion.

Viewed from one vantage point, it is a primary object of the present invention to provide a child's sulky for attachment to a jogger which includes an axle having wheels at extremities thereof, a seat supported on the axle including a limiting device to prevent excessive tipping of the seat backwards, a tongue extending at one end from a bottom side of the seat and forward of the seat including a stop to prevent excessive forward tipping of the seat, and a harness at a free end of the tongue configured to attach to the jogger at a lower back area, whereby the jogger can run substantially unrestricted and the child can safely trail in the sulky.

Viewed from another vantage point, a primary object of the present invention is to provide a device as characterized above in which the harness means used with the child's sulky includes a belt which circumscribes the waist area of the user and has releasable fastening means, the belt having a rear portion including a force distribution plate and a coupling means between the plate and the sulky to removeably attach the sulky to the harness.

Viewed from yet a further vantage point, it is a primary object of the present invention to provide a coupling means that extends between a sulky and a harness worn by a jogger which includes a harness rod removeably attached at one end to a free end of a tongue of the sulky and at another end of the harness rod an instrumentality which allows three degrees of freedom between the harness and the harness rod to allow the jogger to run substantially unconstricted by the sulky.

These and other objects will be made manifest when considering the following detailed specification when taken in conjunction with the appended drawing figures.

BRIEF DESCRIPTION OF THE DRAWING FIGURES

BRIEF DESCRIPTION OF THE PREFERRED EMBODIMENT

Figure 7:
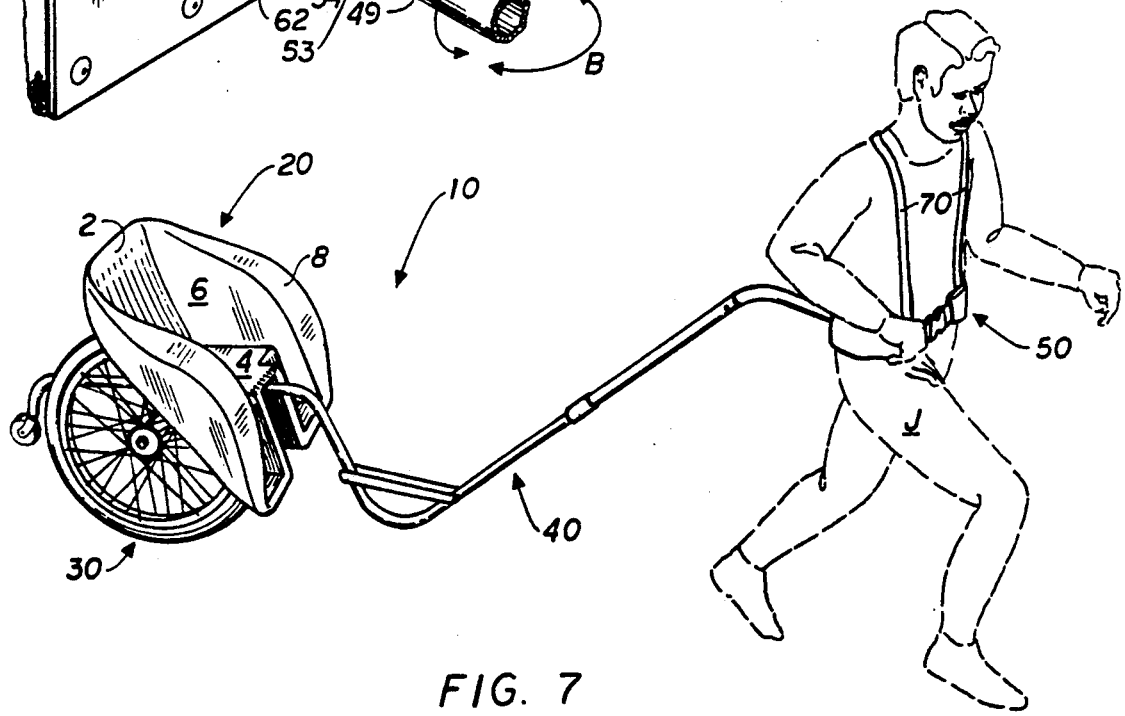
FIG. 7 is a perspective view of the apparatus according to the present invention in its intended environment.

Referring to the drawings now, wherein like reference numerals refer to like parts throughout the various drawing figures, reference numeral 10 is directed to the sulky according to the present invention when used with a jogger, as shown in FIG. 7.

In its essence, the sulky 10 includes a seat area 20, a chassis 30, a tongue 40 and a harness 50. In use, the harness 50 is connected to the jogger J and the tongue 40 is attached to the harness 50.

With respect to FIGS. 1-4, the seat area 20 includes a seat back 2, a horizontal seat portion 4 and side walls 6 which extend upwardly along side edges of the back 2 and seat 4. The child will therefore be secured within this bucket type seat. In addition, the seat includes an arm rest 8 extending from a top edge of the side walls 6 and forwardly along a front edge of the side walls 6. The armrest 8 in turn communicates with a flared skirt 12 which extends downwardly. The skirt 12, arm rest 8 and side wall 6 define wheel wells so that the child at no time will be exposed to the wheel or its spokes.

In addition, the seat area 20 includes a stirrup section so that each of the child's legs will straddle a tongue support 34 to be described. More specifically, each stirrup section includes a back wall 14 which extends downwardly from a front edge of seat 4, a stirrup bottom wall 16 extending forwardly from a bottom edge of back wall 14 and a stirrup inner wall 18 which straddles the tongue support 34 and extends from inner side edges of back wall 14 and bottom wall 16. Thus, one leg is carried in each stirrup and in relative safety because the side walls 6 further define the stirrup cavity within which each leg is placed, and the arm rest 8 flares downwardly to further isolate the child from the wheels. If desired, the device may be provided with seat belts (not shown) for additional safety. Of course, it is contemplated that the child will wear a helmet which is commonly available even for small children.

Figure 4:
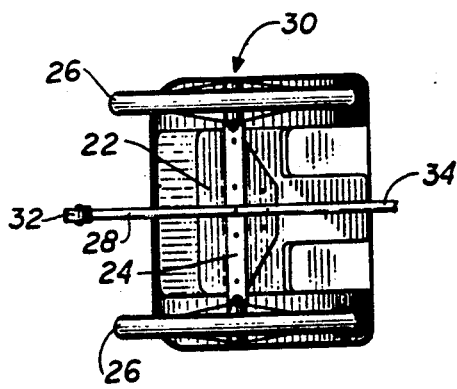
FIG. 4 is a bottom plan view of that which is shown in FIG. 3.

The seat area 20 is supported by a chassis 30 as shown in FIG. 4. More particularly, the chassis 30 includes a plate type frame 22 which in turn supports an axle 24. The axle 24 extends to just beneath each of the wells formed by the flared skirts 12. Free ends of each axle 24 support wheels 26 thereon, and the wheels are dimensioned to fit within the wheel wells such that when the wheels 26 move they are obscured from the child.

Figure 1:
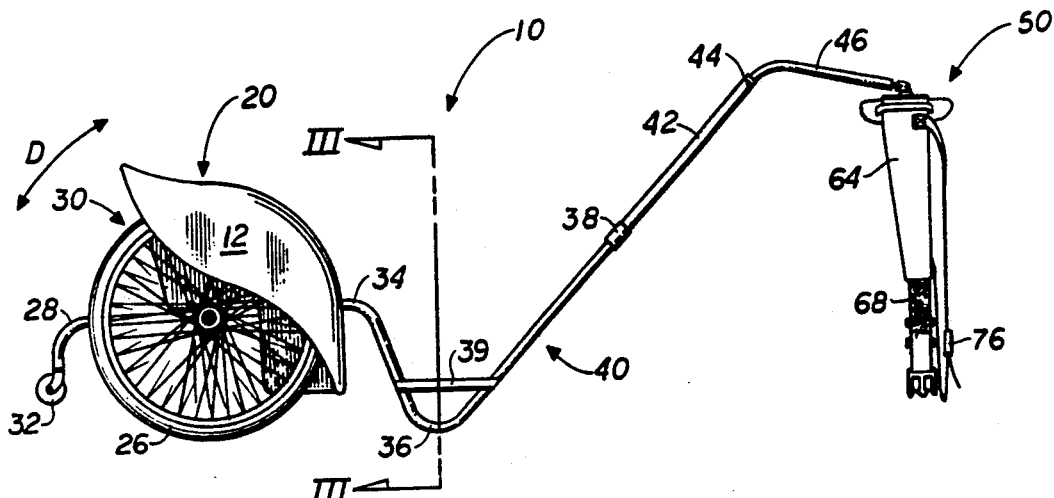
FIG. 1 is a side view of the apparatus according to the present invention.
Figure 2:
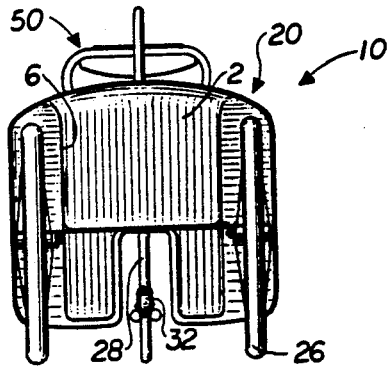
FIG. 2 is a rear view thereof.
Figure 3:
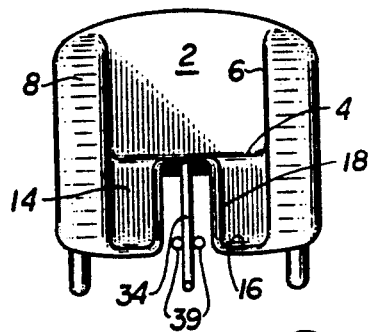
FIG. 3 is a sectional view taken along lines 3—3 of FIG. 1 showing a front portion of the child sulky seat.

A rear portion of the frame 22 includes a bar 28 extending rearwardly therefrom having a free end which carries a caster 32 thereon. When in use, or when the cart is unattended and the child remains in the sulky, a situation may arise where a change in the weight distribution may cause the sulky to tip in the direction of the arrow D (FIG. 1). The caster 32 prevents the sulky from completely tipping over backwards to further protect the child. A forward portion of the bar 28 extends out from under the seat area and defines a tongue support 34 mentioned above. The tongue support extends from the seat area 20 between the leg stirrups and thereafter extends downwardly and thereafter upwardly defining a major portion of the tongue 40. The downwardly extending "U" shaped portion defines a goose neck 36 which, like the caster 32 limits the degree of motion obtainable by the child should the child rock the sulky unassisted. It is contemplated that when at rest, the gooseneck 36 coupled with the two wheels 26 provide a three point suppot for the sulky. The gooseneck 40 may be reinforced with crossbraces 39.

The tongue 40 includes an upwardly extending linear section 42 whose length is adjustable by means of a telescopic coupling 38 disposed substantially midway between the gooseneck and a removeable pin 44 to be described hereinafter. Thus, the telescopic adjustment 38 allows the length of the linear section 42 to be varied in accordance with the height of the jogger as will be explained. A free end of the linear section 42, remote from the seat area 20 includes a harness rod 46 captured in the linear section 42 by means of the removeable pin 44. The harness rod 46 connects to the harness 50 as shown in FIG. 6.

Figure 6:
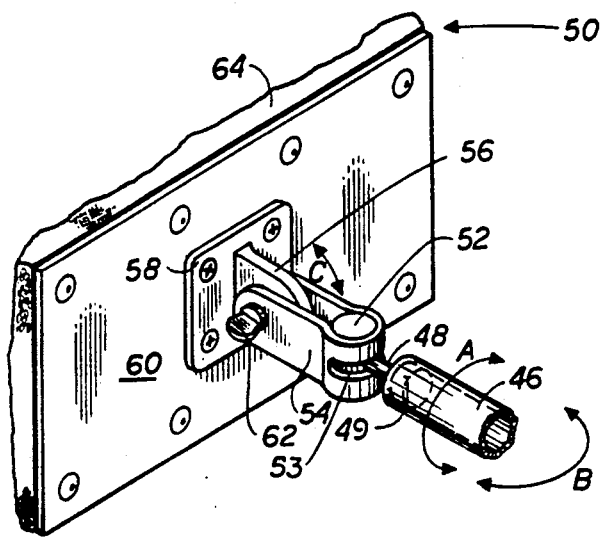
FIG. 6 is a perspective view of the area of attachment between a tongue of the sulky and the harness.

More particularly and referring to FIG. 6, an end of the harness rod 46 has a swivel pin 48 extending axially outwardly therefrom and is constrained to remain within the rod 46 by means of a pin stop 49 fixed within the harness rod 46. Various mechanisms can effect retention of the swivel pin 48 within the harness rod, such as fixing the pin stop 49 by forming an inwardly directed flange at the free end of the harness rod 46. In any event, this arrangement allows rotation of the harness rod 46 along the direction of the double ended arrows A.

A free end of the swivel pin 48 communicates in a vertically extending hinge pin 52 which is constrained within a "U" shaped bracket 54 as will now be described. The bracket 54 includes two legs whose free ends straddle an ear 56 and is fixed thereto by means of a pivot pin 62. Thus, the "U" shaped bracket itself is capable of rotation about the pivot pin 62 along the direction of the double ended arrow C. In addition, the "U" shaped bracket has an enlarged bulbous bight portion within which the hinge pin 52 is constrained. Note that the swivel pin 48 passes through an arcuate slot 53 provided in the bight portion of the "U" shaped bracket so that the hinge pin 52 can rotate about its vertical axis as shown by the double ended arrow B of FIG. 6. Thus, at this one connecting area between the harness rod 46 and the harness 50, three different degrees of motion are provided to afford the jogger substantially unrestricted motion while running and provide safety for the child against the sulky tipping over due to any binding while the jogger is running.

With further reference to FIG. 6, the ear 56 is supported on the harness 50 by means of an ear support 58 fixed to a force distribution plate 60 carried at a trailing portion of the harness immediately adjacent the small area of the jogger's back. It has been determined that communicating the jogger sulky tongue 40 to this point is the most desirable since it provides: first, a relatively low center of gravity, second, minimal up and down motion that occurs at other body points since the pelvic area is relatively "quiet" while one is running, and third, no disturbance to the inherent balance needed when shifting weight while jogging and while turning. These features are enhanced by configuring the harness so that the force distribution plate 60 padding 64 has on a surface closest to the jogger. The padding 64 circumscribes a belt 68 substantially all around the waist and hip area of the jogger to dampen forces and assure that the belt 68 does not cut into the jogger especially at the hip area. In addition, a cushion 66 is interposed behind the force distribution plate 60 and is sandwiched between the belt 68, its padding 64 and the small area of the back which has a natural curvature. Thus, the harness can be secured reliably and there is a minimal amount of "backlash" when starting, stopping, changing speed or cornering.

Figure 5:
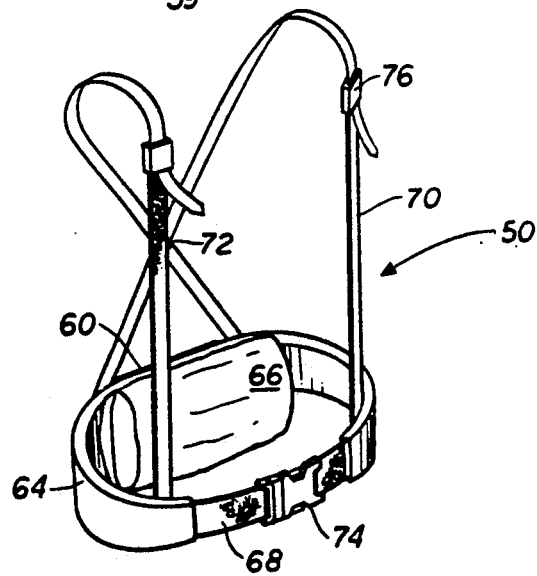
FIG. 5 is a perspective view of the harness according to the present invention.

As shown in FIG. 5, the belt 68 has free ends adjacent the front of the jogger which allow coupling by means of a buckle arrangement known in the art. The buckle 74 has a male and female end at opposed extremities of the belt 68 for removeable attachment. In addition, suspenders 70 are integral with the belt 68 including suspender straps 70 extending vertically upward from the forward portion of the belt 68 and over the shoulder areas of the jogger. Thereafter, the suspenders crisscross along the shoulder blade area of the jogger at cross over 72. The straps are coupled at that point to provide uniform force on the shoulder area which is particularly beneficial during cornering and accelerating. Note in FIG. 1, that a strap adjuster 76 is included on the suspender strap 70 for length adjustment as is needed.

In use and operation, the harness rod 46 is coupled (44) to the free end of the tongue (40) and may be removeably detached as is necessary for temporary dissociation between the sulky and the jogger. The child is secured in the seat area 20, the harness rod 46 is coupled to the tongue 40 and the harness 50 is worn by the jogger to provide the exercise.

Moreover, having thus described the invention, it should be apparent that numerous structural modifications and adaptations may be resorted to without departing from the scope and fair meaning of the invention set forth hereinabove and as defined hereinbelow in the claims.

I claim:

1. A child's sulky for attachment to a jogger comprising in combination:

an axle having wheels at extremities thereof, a seat supported on said axle including limit means to prevent excessive tipping of said seat backwards, a tongue extending at one end from a bottom side of said seat and forward of said seat including a stop means to prevent excessive forward tipping of said seat, and a harness means at a free end of said tongue, configured to attach to the jogger at a lower back area, whereby the jogger can run substantially unrestricted and the child can safely trail in said sulky, wherein said harness means include a belt circumscribing the waist area of the user including releasable fastening means extending between said belt and said tongue, said belt including a rear portion having force distribution means, and dampening means, whereby biochenical efficiency is effected thereby, wherein said releasable fastener means includes coupling means extending between said sulky and said harness which includes a removable harness rod extending between said tongue and said force distribution means, one end of said harness rod attaching to said force distribution means provided with means to allow three degrees of freedom between said harness and said harness rod, wherein said seat includes a horizontal portion, a back portion, a pair of side walls extending along side edges of both said back and seat, an arm rest on a top edge of each said side wall, a downwardly extending flared skirt portion extending from said arm rest defining a wheel well within which a wheel is carried, an underlying axle uniting each said wheel and supported on an underside of said seat, whereby the child has been protected from wheel rotation, including a pair of stirrups straddling said tongue oriented so that one leg of the child can be placed in a respective stirrup comprising:

a stirrup back wall extending downwardly from a forward edge of said seat, a stirrup bottom wall extending from a bottom edge of said stirrup back wall, and a stirrup inner wall extending between said bottom wall and said back wall along inner edges thereof to provide protection and support by defining a recess by which the child's legs are retained, wherein a caster is provided extending rearwardly from said seat area and supported on an extension of said tongue support to preclude tipping over of said sulky, wherein said harness rod connects to said force distribution means by means of three swivels connected in series, a first allowing rotation about a longitudinal axis of said harness rod and formed by a swivel pin extending from a free end of said harness rod and fixed to a vertically extending hinge pin, said hinge pin in turn allowing rotation about its vertical axis, whereby said harness rod moves in an arc about the vertical axis of said hinge pin, said hinge pin constrained with a "U" shaped bracket pivotally attached to an ear defined as a vertical plate and captured by legs of said "U" shaped bracket whereby said harness rod can move orthogonally about said ear.

2. A sulky for a child which includes a harness means comprising, in combination:

a belt circumscribing the waist area of the user having free ends accessible by a jogger and coupled by means of a buckle clasp, a belt rear portion including a force distribution plate, and coupling means between said force distribution plate and said harness means, wherein said coupling means extend between said sulky and said harness means wherein said coupling means includes a harness rod extending between a tongue and said force distribution plate, one end of said harness rod attaching to said force distribution plate provided with means to allow three degrees of freedom between said harness and said harness rod, a child's seat area including a horizontal seat portion, a back portion, a pair of side walls extending along side edges of both said back and seat, an arm rest on a top edge of each said side wall, downwardly extending flared skirt portion extending from said arm rest defining a wheel well within which a wheel is carried, an underlying axle uniting each said wheel and supported on an underside of said seat, whereby the child has been protected from wheel rotation, including a pair of stirrups straddling said tongue oriented so that one leg of the child can be placed in each stirrup comprising:

a stirrup back wall extending downwardly from a forward edge of said seat, a stirrup bottom wall extending from a bottom edge of said stirrup, and a stirrup inner wall extending between said stirrup bottom wall and back wall along an inner edge thereof to proved protection and support by defining a recess by which the child's legs are retained, wherein a caster is provided extending rearwardly from said seat area and supported on an extension of said tongue to preclude tipping over of said sulky, wherein said harness rod connects to said force distribution plate by means of three swivels connected in series, a first allowing rotation about a longitudinal axis of said harness rod and formed by a swivel pin extending from a free end of said harness rod and fixed to a vertically extending hinge pin, said hinge pin in turn allowing vertical rotation about its axis, whereby said harness rod moves in an arc about the vertical axis of said hinge pin said hinge pin constrained with a "U" shaped bracket pivotally attached to an ear defined as a vertical plate and captured by legs of said "U" shaped bracket whereby said harness rod can move orthogonally about said ear.

3. A sulky for a child which includes a coupling means between a tongue extending from a bottom side of a seat and a harness worn by a jogger, comprising, in combination:

a harness rod removably attached at one end with releasable fastening means defined by a removable pin to a free end of a section of a tongue support extending from said seat of said sulky and, at another end of said harness rod, means to allow three degrees of freedom between said harness and said harness rod to allow the jogger to run substantially unconstricted by said sulky, wherein said harness includes a belt circumscribing the waist area of the user and a force distribution plate, one end of said harness rod attaching to said force distribution plate provided with said means to allow three degrees of freedom, said belt including a rear portion having said force distribution plate, and dampening means, where biomechanical efficiency is effected thereby, wherein said seat includes a horizontal seat portion, a back portion, a pair of side walls extending along side edges of both said back and seat, an arm rest on a top edge of each said side wall, a downwardly extending flared skirt portion extending from said arm rest defining a wheel well within which a wheel is carried within said wheel well, an underlying axle uniting each said wheel and supported on an underside of said seat, whereby the child has been protected from wheel rotation, including a pair of stirrups straddling said tongue oriented so that one leg of the child can be placed in each stirrup comprising:

a stirrup back wall extending downwardly from a forward edge of said seat, a stirrup bottom wall extending from a bottom edge of said stirrup, and a stirrup inner wall extending between said stirrup's bottom wall and back wall along an inner edge thereof to provide protection and support by defining a recess by which the child's legs are retained, wherein a caster is provided extending rearwardly from said seat area and supported on an extension of a tongue support to prelude tipping over of said sulky, wherein said harness rod connects to said force distribution plate by said means to allow three degrees of freedom formed of three swivels connected in series, a first allowing rotation about a longitudinal axis of said harness rod and formed by a swivel pin extending from a free end of said harness rod and fixed to a vertically extending hinge pin, said hinge pin in turn allowing rotation about its vertical axis, whereby said harness rod moves in an arc about the vertical axis of said hinge pin, said hinge pin constrained within a "U" shaped bracket pivotally attached to an ear defined as a vertical plate and captured by legs of said "U" shaped bracket whereby said harness rod can move orthogonally about said ear.

4. A child's sulky for attachment to a jogger comprising in combination:

an axle having wheels at extremities thereof, a seat supported on said axle including limit means to prevent excessive tipping of said seat backwards, a tongue extending at one end from a bottom side of said seat and forward of said seat including a stop means to prevent excessive forward tipping of said seat, and a harness means at a free end of said tongue, configured to attach to the jogger at a lower back area, whereby the jogger can run substantially unrestricted and the child can safely trail in said sulky, wherein said harness means includes a harness rod connecting said tongue to a force distribution means by means of three swivels: a first said swivel allowing rotation about a longitudinal axis of said harness rod and formed by a swivel pin extending from a free end of said harness rod and fixed to a vertically extending hinge pin, said hinge pin defining a second said swivel and in turn allowing rotation about its vertical axis, whereby said harness rod moves in an arc about the vertical axis of said hinge pin, said hinge pin constrained within a "U" shaped bracket pivotally attached to an ear defined as a vertical plate and captured by legs of said "U" shaped bracket whereby said harness rod can move orthogonally about said ear and defines a third said swivel.

5. The sulky of claim 4 wherein said harness means include a belt circumscribing the waist area of the user including releaseable fastening means extending between said belt and said tongue, said belt including a rear portion having force distribution means, and dampening means, whereby biomechanical efficiency is effected thereby.

6. The sulky of claim 5 wherein said seat includes a horizontal portion, a back portion, a pair of side walls extending along side edges of both said back and seat, an arm rest on said top edge of each said side wall, a downwardly extending flared skirt portion extending from said arm rest defining a wheel well within which a wheel is carried, an underlying axle uniting each said wheel and supported on an underside of said seat, whereby the child has been protected from wheel rotation.

7. The sulky of claim 6 including a pair of stirrups straddling said tongue oriented so that one leg of the child can be placed in a respective stirrup comprising:

a stirrup back wall extending downwardly from a forward edge of said seat, a stirrup bottom wall extending from a bottom edge of said stirrup back wall, and a stirrup inner wall extending between said bottom wall and said back wall along inner edges thereof to provide protection and support by defining a recess by which the child's legs are retained.

8. The sulky of claim 7 wherein a caster is provided extending rearwardly from said seat area and supported on an extension of said tongue support to preclude tipping over of said sulky.

9. A sulky for a child including a tongue projecting from said sulky and a harness means for attachment to a jogger comprising, in combination:

a belt circumscribing the waist area of the jogger having free ends adjacent the jogger coupled by means of a buckle arrangement, a belt rear portion including a force distribution plate, and coupling means between said plate and said tongue of said sulky, wherein said tongue connects to said force distribution plate by means of three swivels: a first said swivel allowing rotation about a longitudinal axis of said tongue and formed by a swivel pin extending from a free end of said tongue and fixed to a vertically extending hinge pin, said hinge pin in turn allowing vertical rotation about its axis and defining a second said swivel, whereby said tongue moves in an arc about the vertical axis of said hinge pin, said hinge pin constrained with a "U" shaped bracket pivotally attached to an ear defined as a vertical plate and captured by legs of said "U" shaped bracket whereby said harness rod can move orthogonally about said ear defining a third said swivel.

10. The sulky of claim 9 including horizontal seat portion, a back portion, a pair of side walls extending along side edges of both said back and seat, an arm rest on said top edge of each said side wall, downwardly extending flared skirt portion extending from said arm rest defining a wheel well within which a wheel is carried, an underlying axle uniting each said wheel and supported on an underside of said seat, whereby the child has been protected from wheel rotation.

11. The sulky of claim 10 including a pair of stirrups straddling said tongue oriented so that one leg of the child can be placed in each stirrup comprising:

a stirrup back wall extending downwardly from a forward edge of said seat, a stirrup bottom wall extending from a bottom edge of said stirrup, and a stirrup inner wall extending between said stirrup bottom wall and back wall along an inner edge thereof to provide protection and support by defining a recess by which the child's legs are retained.

12. The sulky of claim 11 wherein a caster is provided extending rearwardly from said seat area and supported on an extension of said tongue support to preclude tipping over of said sulky.

13. A sulky for a child which includes a coupling means between a tongue extending from said sulky and a harness worn by a jogger with a force distribution means including a force distribution plate disposed between said sulky and said harness, comprising, in combination:

a harness rod removably attached at one end by a removable pin to a free end of said tongue remote from said sulky defining releasable fastening means and, at another end of said harness rod, means to allow three degrees of freedom between said harness and said harness rod to allow the jogger to run substantially unconstrained by said sulky, wherein said harness rod connects to said force distribution plate by means of three swivels: a first said swivel allowing rotation about a longitudinal axis of said harness rod and formed by a swivel pin extending from a free end of said harness rod and fixed to a vertically extending hinge pin, said hinge pin in turn allowing rotation about its vertical axis and defining a second said swivel, whereby said harness rod moves in an arc about the vertical axis of said hinge pin, said hinge pin constrained within a "U" shaped bracket pivotally attached to an ear defined as a vertical plate and captured by legs of said "U" shaped bracket whereby said harness rod can move orthogonally about said ear and define a third swivel.

14. The sulky of claim 13 wherein said harness includes a belt circumscribing the waist area of the user including said releasable fastening means extending between said belt and said tongue, said belt including a rear portion having said force distribution means, and dampening means, whereby biomechanical efficiency is effected thereby.

15. The sulky of claim 14 wherein said sulky includes a horizontal seat portion, a back portion, a pair of side walls extending along side edges of both said back and seat, an arm rest on said top edge of each said side wall, downwardly extending flared skirt portion extending from said arm rest defining a wheel well within which a wheel is carried, an underlying axle uniting each said wheel and supported on an underside of said seat, whereby the child has been protected from wheel rotation.

16. The sulky of claim 15 including a pair of stirrups straddling said tongue oriented so that one leg of the child can be placed in each stirrup comprising:
- a stirrup back wall extending downwardly from a forward edge of said seat,
- a stirrup bottom wall extending from a bottom edge of said stirrup, and
- a stirrup inner wall extending between said stirrup's bottom wall and back wall along an inner edge thereof to provide protection and support by defining a recess by which the child's legs are retained.

17. The sulky of claim 16 wherein a caster is provided extending rearwardly from said seat area and supported on a bar extending from said sulky to preclude tipping over of said sulky.